(12) United States Patent
Miyazaki et al.

(10) Patent No.: US 12,259,631 B2
(45) Date of Patent: Mar. 25, 2025

(54) OPTICAL CONTROL ELEMENT, OPTICAL MODULATION DEVICE USING SAME, AND OPTICAL TRANSMISSION APPARATUS

(71) Applicant: SUMITOMO OSAKA CEMENT CO., LTD., Tokyo (JP)

(72) Inventors: Norikazu Miyazaki, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 260 days.

(21) Appl. No.: 17/916,400

(22) PCT Filed: Dec. 4, 2020

(86) PCT No.: PCT/JP2020/045293
§ 371 (c)(1),
(2) Date: Sep. 30, 2022

(87) PCT Pub. No.: WO2021/199502
PCT Pub. Date: Oct. 7, 2021

(65) Prior Publication Data
US 2023/0152660 A1    May 18, 2023

(30) Foreign Application Priority Data

Mar. 31, 2020    (JP) ................. 2020-062110

(51) Int. Cl.
*G02B 6/12*    (2006.01)
*G02F 1/01*    (2006.01)
(Continued)

(52) U.S. Cl.
CPC ............ *G02F 1/2255* (2013.01); *G02B 6/12* (2013.01); *G02F 1/0123* (2013.01); *G02F 1/035* (2013.01);
(Continued)

(58) Field of Classification Search
CPC ......... G02B 6/12; G02F 1/0123; G02F 1/035; G02F 1/212; G02F 1/225; G02F 1/2255; H04B 10/516
See application file for complete search history.

(56) References Cited

U.S. PATENT DOCUMENTS 8,346,025 B2 *   1/2013   Gill ...................... G02F 1/2257
                                                               438/31
9,081,253 B2 *   7/2015   Kono ...................... G02F 1/225
(Continued)

FOREIGN PATENT DOCUMENTS

JP    2012163876 A    8/2012
JP    2017156400 A    9/2017
(Continued)

OTHER PUBLICATIONS

Japanese Patent Office, International Search Report, PCT/JP2020/045293, Feb. 22, 2021, Japan.

*Primary Examiner* — Ryan A Lepisto
(74) *Attorney, Agent, or Firm* — IpHorgan Ltd.

(57) ABSTRACT

Provided is an optical control element that can minimize an optical path difference between branched waveguides while reducing a difference in structure between the branched waveguides by disposing an input portion and an output portion of an optical waveguide on the same side of a substrate on which the optical waveguide is formed. An optical control element includes a substrate 1 having an electro-optic effect, an optical waveguide 2 formed on the substrate, and a control electrode controlling a light wave propagating through the optical waveguide, in which an input portion (input light L1) and an output portion (output light L2) of the optical waveguide are formed on the same side of the substrate, the optical waveguide includes at least one Mach-Zehnder type optical waveguide portion (MZ) that has two branched waveguides (21, 22) branched from
(Continued)

one optical waveguide and combines the two branched waveguides to form one optical waveguide, and the branched waveguides have an even number of turned-back potions (A1, A2).

8 Claims, 9 Drawing Sheets

(51) Int. Cl.
    *G02F 1/035*     (2006.01)
    *G02F 1/21*     (2006.01)
    *G02F 1/225*     (2006.01)
    *H04B 10/516*     (2013.01)

(52) U.S. Cl.
    CPC ............ *G02F 1/212* (2021.01); *G02F 1/225* (2013.01); *H04B 10/516* (2013.01)

(56) References Cited

U.S. PATENT DOCUMENTS

| | | | |
|---|---|---|---|
| 10,423,014 B2* | 9/2019 | Sugiyama | G02F 1/011 |
| 10,955,723 B2* | 3/2021 | Sugiyama | G02F 1/218 |
| 11,003,044 B2* | 5/2021 | Hara | G02F 1/2255 |
| 11,852,878 B2* | 12/2023 | Sugiyama | G02B 6/29349 |
| 2011/0142457 A1* | 6/2011 | Betty | G02B 6/4293 385/14 |
| 2013/0170782 A1 | 7/2013 | Evans | |
| 2013/0202312 A1 | 8/2013 | Shen | |
| 2014/0185978 A1 | 7/2014 | Liao | |
| 2017/0248804 A1 | 8/2017 | Sugamata | |
| 2017/0357140 A1 | 12/2017 | Goodwill | |
| 2018/0039151 A1 | 2/2018 | Doerr | |
| 2018/0275482 A1 | 9/2018 | Kitamura | |
| 2018/0329269 A1 | 11/2018 | Ward | |
| 2019/0011800 A1 | 1/2019 | Kikuchi | |
| 2019/0162984 A1 | 5/2019 | Sugiyama | |
| 2020/0218126 A1 | 7/2020 | Iwatsuka | |
| 2020/0272021 A1* | 8/2020 | Hara | G02F 1/0356 |

FOREIGN PATENT DOCUMENTS

| | | |
|---|---|---|
| JP | 2017181676 A | 10/2017 |
| JP | 2018159872 A | 10/2018 |
| JP | 2018534627 A | 11/2018 |
| JP | 2019-015791 A | 1/2019 |
| JP | 201995698 A | 6/2019 |
| JP | 2020134876 A | 8/2020 |
| WO | 2019039215 A1 | 2/2019 |

* cited by examiner

OPTICAL CONTROL ELEMENT, OPTICAL MODULATION DEVICE USING SAME, AND OPTICAL TRANSMISSION APPARATUS

CROSS REFERENCE TO RELATED APPLICATIONS

This application is a national stage completion application of PCT Application No. PCT/JP2020/045293, filed Dec. 4, 2020, and claims priority from Japanese Patent Application No. 2020-062110, filed Mar. 31, 2020. Each of these applications is incorporated by reference herein in its entirety.

TECHNICAL FIELD

The present invention relates to an optical control element and an optical modulation device and an optical transmission apparatus using the same, and more particularly to an optical control element having an input portion and an output portion of an optical waveguide on the same side of a substrate.

BACKGROUND ART

In the field of optical communication and optical measurement, an optical control element is often used, which includes an optical waveguide on a substrate having an electro-optic effect, such as being made of lithium niobate (LN), and a control electrode for controlling a light wave propagating through the optical waveguide. An optical modulator that is an example of an optical control element is required to have a wide band of 400 Gbps or more and to be compact.

Specifically, in order to reduce a signal propagation loss when a high-frequency signal is input to the optical control element, it is desirable that a driver circuit that generates the high-frequency signal and the optical control element are disposed close to each other, and a signal line is formed in a linear shape. Thus, an optical modulator has been proposed in which a high-frequency signal is input from one end face of a case that accommodates an optical control element, and a light wave is input and output from the opposite end face.

As means for miniaturizing an optical control element itself, Patent Literature No. 1 proposes a technique of bending an optical waveguide in an optical modulator multiple times to shorten an element length. Patent Literature No. 2 discloses that an optical waveguide in an optical modulator is bent only once while disposing an optical input end and an optical output end on the same side of the optical modulator.

On the other hand, a Mach-Zehnder type optical waveguide is used as the optical waveguide incorporated in the optical control element, and optical modulation is performed according to an optical path difference of light waves propagating through two branched waveguides. As disclosed in Patent Literature No. 2, when the Mach-Zehnder type optical waveguide is turned-back, the optical path difference changes between the two branched waveguides, and thus an operation bias point voltage of the Mach-Zehnder type optical waveguide changes depending on wavelengths of the propagating light waves. Thus, it is necessary to adjust a bias point by greatly changing a bias voltage each time a wavelength changes.

In order to solve the problem described above, Patent Literature No. 3 proposes a technique in which a delay waveguide portion is provided in one of two branched waveguides in order to make optical path lengths of the branched waveguides the same. In this case, there are also restrictions on the bending radius of the optical waveguide, and thus it is difficult to compactly configure delay waveguide that compensates for the optical path difference between the branched waveguides outside and inside the turned-back potion while reducing an increase in a loss of the optical waveguide. If the branched waveguides have different bending waveguide configurations, there will be a difference in optical loss between the branched waveguides, and there will also be a problem that an on/off extinction ratio of the Mach-Zehnder type optical waveguide will deteriorate.

CITATION LIST

Patent Literature

[Patent Literature No. 1] International Publication No. WO2019/039215
[Patent Literature No. 2] Japanese Laid-open Patent Publication No. 2019-95698
[Patent Literature No. 3] PCT Japanese Translation Patent Publication No. 2018-534627

SUMMARY OF INVENTION

Technical Problem

An object of the present invention is to provide an optical control element that solves the above-described problems and can minimize an optical path difference between branched waveguides while reducing a difference in structure between the branched waveguides by disposing an input portion and an output portion of an optical waveguide on the same side of a substrate on which the optical waveguide is formed. Another object of the present invention is to provide an optical modulation device and an optical transmission apparatus using this optical control element.

Solution to Problem

In order to solve the above problems, the optical control element, the optical modulation device, and the optical transmission apparatus of the present invention have the following technical features.

(1) An optical control element includes a substrate having an electro-optic effect; an optical waveguide formed on the substrate; and a control electrode controlling a light wave propagating through the optical waveguide, in which an input portion and an output portion of the optical waveguide are formed on the same side of the substrate, the optical waveguide includes at least one Mach-Zehnder type optical waveguide portion that has two branched waveguides branched from one optical waveguide and combines the two branched waveguides to form one optical waveguide, and the branched waveguides have an even number of turned-back potions.

(2) In the optical control element according to the above (1), optical path lengths of the branched waveguides are set to be same as each other.

(3) In the optical control element according to the above (1) or (2), one optical waveguide is branched into a plurality of optical waveguides, each branched optical waveguide is provided with the Mach-Zehnder type optical waveguide portion, and the branched waveguides of the Mach-Zehnder type optical waveguide portion have an even number of turned-back potions in a state in which the Mach-Zehnder type optical waveguide portions are disposed in parallel.

(4) In the optical control element according to any one of the above (1) to (3), the control electrode includes a modulation electrode and a bias electrode, and the modulation electrode and the bias electrode are provided in different sections for a plurality of sections separated by the turned-back potion of the branched waveguide.

(5) An optical modulation device includes the optical control element according to any one of the above (1) to (4); a case that accommodates the optical control element; and an optical fiber through which light waves are input to and output from the optical control element.

(6) In the optical modulation device according to the above (5) further includes an electronic circuit that amplifies a modulation signal input to the optical control element and is provided inside the case.

(7) An optical transmission apparatus includes the optical modulation device according to the above (5) or (6); and an electronic circuit that outputs a modulation signal for causing the optical modulation device to perform a modulation operation.

Advantageous Effects of Invention

According to the present invention, in an optical control element including a substrate having an electro-optic effect; an optical waveguide formed on the substrate; and a control electrode controlling a light wave propagating through the optical waveguide, an input portion and an output portion of the optical waveguide are formed on the same side of the substrate, the optical waveguide includes at least one Mach-Zehnder type optical waveguide portion that has two branched waveguides branched from one optical waveguide and combines the two branched waveguides to form one optical waveguide, and the branched waveguides have an even number of turned-back potions.

Therefore, it is possible to provide optical control element that can minimize an optical path difference between branched waveguides while reducing a difference in structure between the branched waveguides by disposing an input portion and an output portion of an optical waveguide on the same side of a substrate on which the optical waveguide is formed. As a result, the wavelength dependence of an operation bias point voltage of the Mach-Zehnder type optical waveguide can be suppressed, a propagation loss of a light wave in each branched waveguide can be reduced, and a high on/off extinction ratio can be realized.

DESCRIPTION OF EMBODIMENTS

Figure 1:
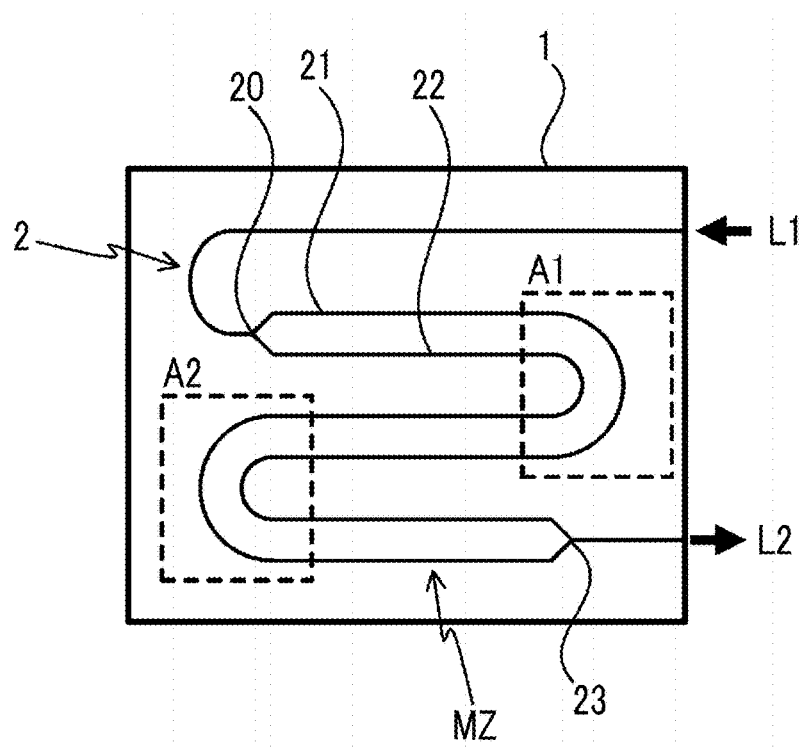
FIG. 1 is a plan view showing Example 1 of an optical control element according to the present invention.

Hereinafter, the present invention will be described in detail by using preferred examples.

As shown in FIGS. 1 to 9, according to the present invention, in an optical control element including a substrate 1 having an electro-optic effect, an optical waveguide 2 formed on the substrate, and control electrodes (M, B1 to B2, and the like) that control a light wave propagating through the optical waveguide, an input portion (input light L1) and an output portion (output light L2) of the optical waveguide are formed on the same side of the substrate, the optical waveguide includes at least one Mach-Zehnder type optical waveguide portion (MZ) that has two branched waveguides (21, 22) that are branched from one optical waveguide and combines the two branched waveguides to form one optical waveguide, and the branched waveguides have an even number of turned-back potions (A1, A2).

As the substrate 1 having an electro-optic effect, a substrate made of a material such as lithium niobate (LN), lithium tantalate (LT), or lead lanthanum zirconate titanate (PLZT), or a vapor deposition film of these materials or a composite substrate or the like in which these materials are bonded to different substrates may be used.

Various materials such as semiconductor materials or organic materials may also be used for optical waveguides.

As a method of forming an optical waveguide, a rib-type optical waveguide is used in which a portion of a substrate corresponding to the optical waveguide is made to protrude, such as by etching a surface of the substrate other than the optical waveguide or by forming grooves on both sides of the optical waveguide. An optical waveguide may be formed by forming a high refractive index portion on the substrate surface by using Ti or the like according to a thermal diffusion method, a proton exchange method, or the like. A composite optical waveguide may be formed, for example, by diffusing a high refractive index material in a rib-type optical waveguide portion.

A thickness of the substrate 1 on which the optical waveguide is formed is set to 10 μm or less, more preferably 5 μm or less in order to achieve velocity matching between a microwave of a modulation signal and a light wave.

A ratio h/t of height h of the rib-type optical waveguide (from the bottom of the groove on both sides of the rib-type optical waveguide to the top side of the rib-type optical waveguide protruding portion) to a substrate thickness t of the rib-type optical waveguide portion (from the bottom surface of the substrate to the top side of the rib-type optical waveguide protruding portion) is set to 0.8 or less. For example, in a case where the substrate thickness t is 1 μm or less, h/t is set in the range of 0.6 to 0.8. A vapor deposition film may be formed on the reinforcing substrate 1, and the film may be processed into a shape of the optical waveguide as described above.

The substrate on which the optical waveguide is formed is adhered and fixed to a reinforcing substrate through direct bonding or an adhesive layer of resin or the like in order to increase mechanical strength. As the reinforcing substrate to be directly bonded, a material having a refractive index lower than that of the optical waveguide or the substrate on which the optical waveguide is formed and a thermal expansion coefficient close to that of the optical waveguide, such as quartz, is preferably used. In a case where the reinforcing substrate is bonded via an intermediate layer having a low refractive index, the same material as the substrate on which the optical waveguide is formed, for example, an LN substrate may be used as the reinforcing substrate, or a high refractive index substrate such as a silicon substrate may be used as the reinforcing substrate.

A feature of the optical control element of the present invention is that, as shown in FIG. 1, the optical waveguide 2 formed on the substrate 1 has at least one Mach-Zehnder type optical waveguide portion (MZ). A feature is to minimize an optical path difference between the branched waveguides (21, 22) between a branch portion 20 and a Y-junction 23 that configure the Mach-Zehnder type optical waveguide portion (MZ).

In order to minimize an optical path difference between the branched waveguides (21, 22), as shown in FIG. 1, an even number of turned-back potions (A1, A2) related to the branched waveguides is formed. By making the shapes of the optical waveguides at the turned-back potions A1 and A2 the same, not only can the optical path lengths of the branched waveguides be set to be equal to each other, but also propagation losses of the optical waveguides can be set to be the same. As a result, a loss difference between the branched waveguides is reduced, and deterioration in the on/off extinction ratio of the Mach-Zehnder type optical waveguide can be suppressed.

Figure 2:
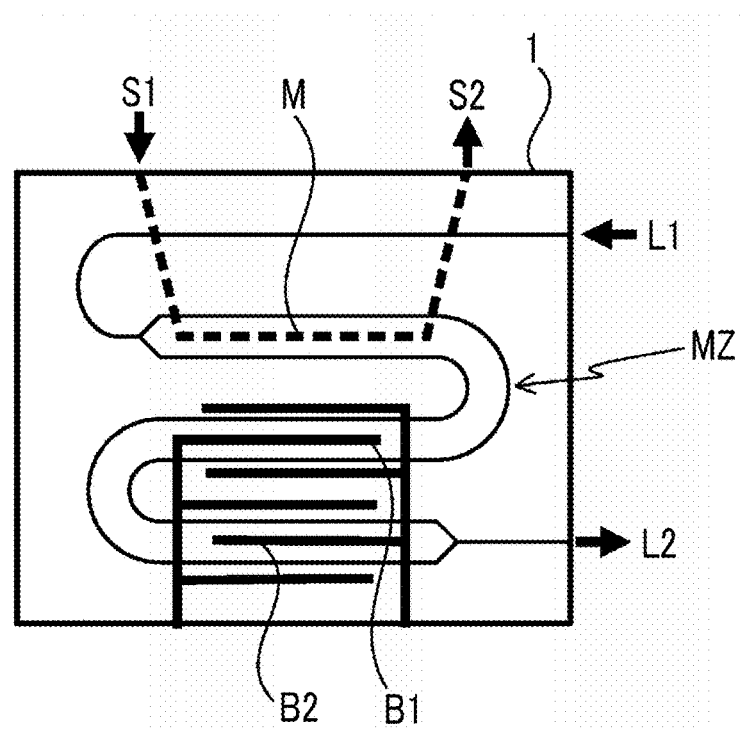
FIG. 2 is a plan view showing Example 2 of an optical control element according to the present invention.

FIGS. 2 and 3 clearly show that the same optical waveguide shape as that of the optical control element in FIG. 1, and further show a modulation electrode M and bias electrodes (B1, B2) which are control electrodes. A common technical feature in FIGS. 2 and 3 is that the modulation electrode M and the bias electrodes (B1, B2) are provided in different sections for a plurality of sections of the branched waveguides (21, 22) separated by the turned-back potions (A1, A2) shown in FIG. 1.

In FIG. 1, the sections may be classified as three sections such as a first section preceding the turned-back potion A1 (a section from the branch portion 20 to the turned-back potion A1), a second section between the turned-back potions A1 and A2 (a section from the turned-back potion A1 to the turned-back potion A2), and a third section after the turned-back potion A2 (a section from the turned-back potion A2 to the Y-junction 23). In FIGS. 2 and 3, the modulation electrode M is disposed in the first section, the bias electrode B1 is disposed in the second section, and the bias electrode B2 is disposed in the third section.

Since the modulation electrode M propagates a high-frequency signal through the modulation electrode M, it is preferable to reduce the bending of the electrode in order to reduce deterioration in the high-frequency signal. Therefore, the modulation electrode M is disposed to fit within one section. In FIG. 2, a modulation signal S1 is introduced from a direction (upper side of the substrate 1) perpendicular to the extending direction (horizontal direction in the drawing) of an action portion (a portion that applies an electric field to the optical waveguide) of the modulation electrode M. Therefore, a bent portion is required to be provided in a part of a lead-in portion of the modulation electrode (a portion between the input portion of the modulation signal and the action portion). In order to suppress deterioration in a high-frequency signal due to this bent portion, as shown in FIGS. 3A to 3C, the modulation electrode M is formed in a linear shape from the input portion of the action portion and the modulation signal S1 is introduced, and thus the bending of the lead-in portion of the modulation electrode can also be reduced to make it possible to further suppress the deterioration in a high-frequency signal.

A modulation signal S2 is derived from a termination side of the modulation electrode, and the derived modulation signal S2 is introduced to a terminator including a termination resistor and the like. Regarding bending of the electrode in the subsequent stage from the action portion of the modulation electrode, deterioration in a high-frequency signal such as a bending loss does not influence a frequency response of electro-optical modulation, and the design can be set with a high degree of freedom. In order to reduce the influence of signal leakage, reflection, or the like due to the bending, a terminator may be disposed on the substrate or a resistive film may be formed on the substrate.

Figure 3A:
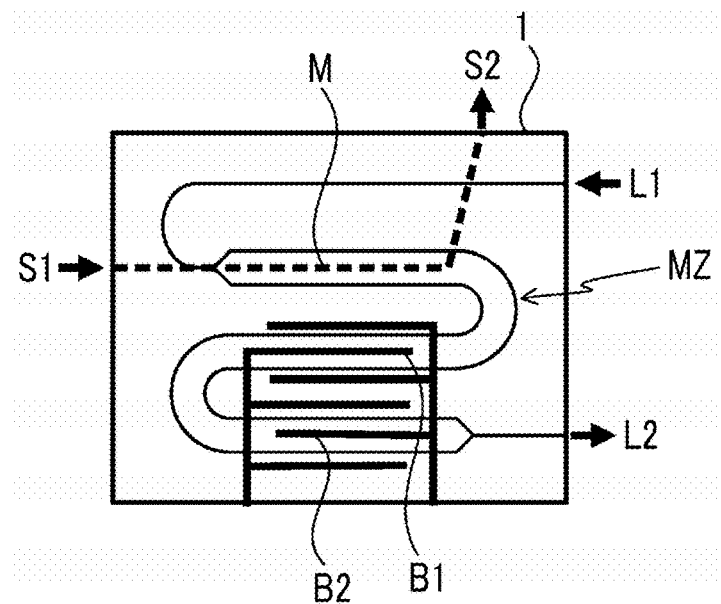
FIGS. 3A to 3C are plan views showing Example 3 of an optical control element according to the present invention.
Figure 3B:
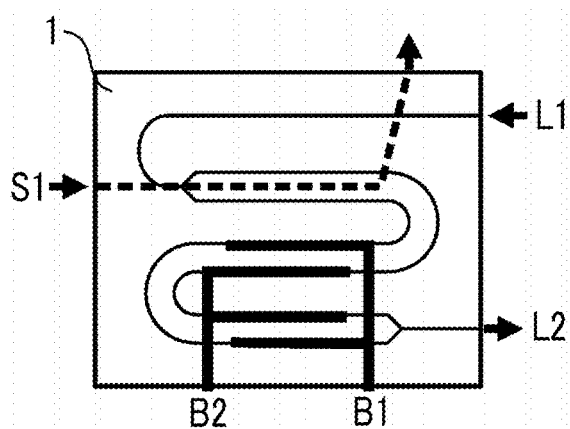
Figure 3C:
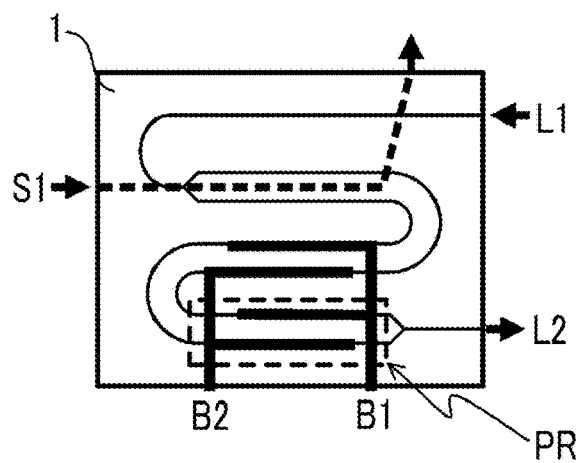

As shown in FIGS. 3A to 3C, by not disposing the bias electrodes (B1, B2) in the propagation direction of the modulation signal S1 in the modulation electrode M, it is possible to suppress a situation in which a leakage signal from the modulation electrode is coupled to the bias electrode, and thus an optical modulation signal becomes unstable due to the addition of high-frequency noise.

The bias electrodes (B1, B2) may be effectively disposed by using a section where the modulation electrode is not disposed. Although only one of B1 or B2 functions as the bias electrode, as shown in FIGS. 2 and 3, by occupying a plurality of sections and forming a long bias electrode along the optical waveguide, a bias voltage can be lowered and this contributes to suppressing the DC drift phenomenon. Although the electro-optical efficiency is decreased, a light loss due to the bias electrode can be reduced by keeping the bias electrode away from the optical waveguide.

FIGS. 2 and 3A to 3C show an example in which the substrate 1 employs a substrate (for example, an X-cut LN substrate; hereinafter referred to as an X substrate) in which a signal electrode is disposed between optical waveguides. Of course, it goes without saying that the present invention can also be applied to an example using a substrate (for example, a Z-cut LN substrate; hereinafter referred to as a Z substrate) in which a signal electrode is disposed on an optical waveguide. The present invention can also be applied to materials other than LN, such as semiconductors, as long as the materials have the optical waveguide/electrode disposition relationship described above. In FIGS. 2 and 3, a ground electrode is not illustrated for the sake of simplification of the drawings.

In a case where the bias electrodes are formed in two different sections, the bias electrodes are disposed, for example, as shown in FIG. 2 or FIG. 3A such that signs of phase changes before and after the turned-back potion are the same.

FIGS. 3B and 3C show an example using a Z substrate, and in particular show a specific example of a disposition pattern of the bias electrodes (B1, B2). In FIG. 3C, a region PR surrounded by a dotted line indicates a polarization reversal region.

In a case where an electrode is disposed on the optical waveguide, a two-electrode modulation configuration in which an electrode is disposed in each of two branched waveguides to achieve zero chirps in the modulation function of the Mach-Zehnder type optical waveguide portion or a configuration in which one modulation electrode is disposed to be switched between two branched waveguides by using polarization reversal may be employed.

Figure 4:
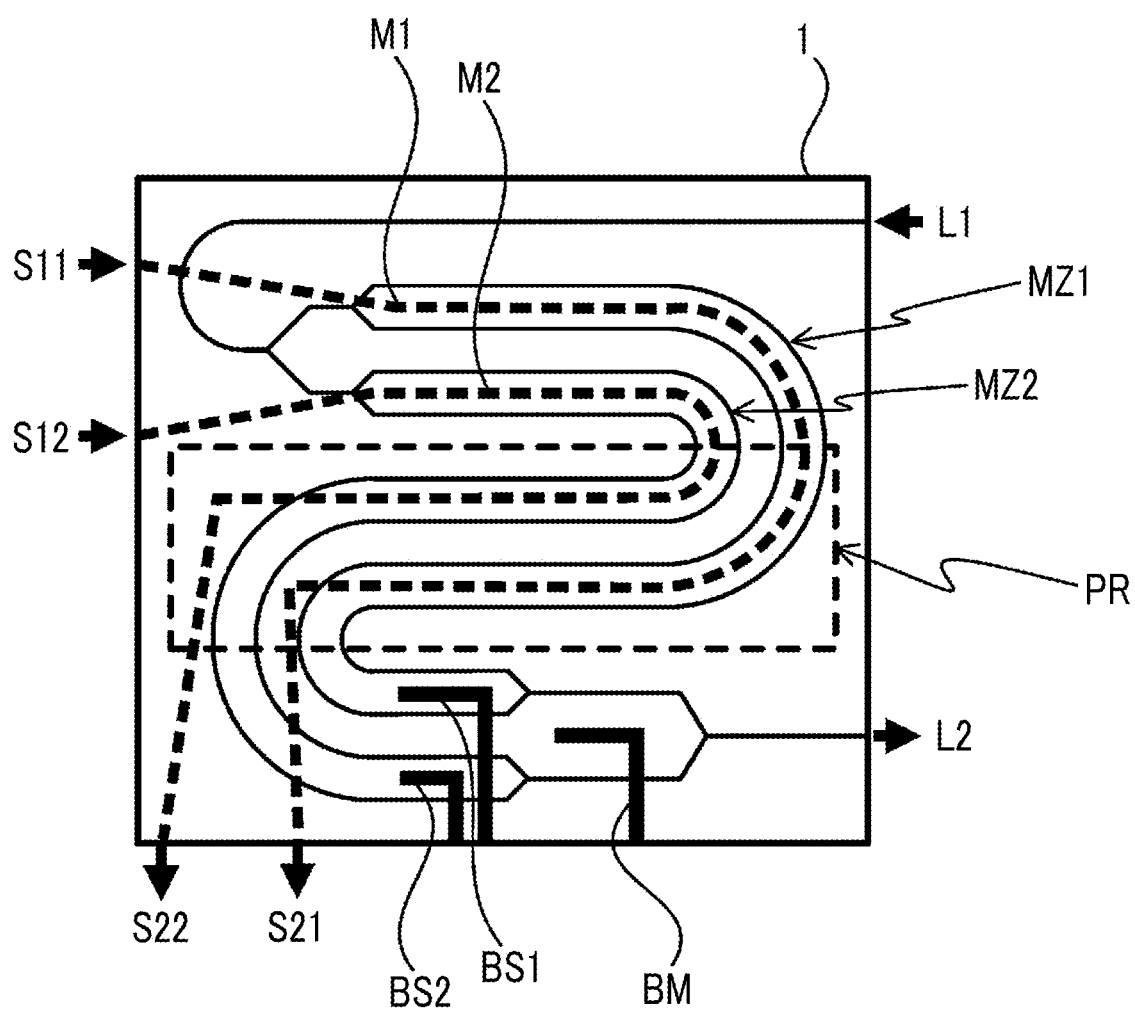
FIG. 4 is a plan view showing Example 4 of an optical control element according to the present invention.

FIG. 4 shows an example using a so-called nest type optical waveguide in which secondary sub-Mach-Zehnder type optical waveguides (MZ1, MZ2) are nested in each branched waveguide of a main Mach-Zehnder type optical waveguide. In such a configuration, a modulation electrode may be disposed in a plurality of sections (here, two sections) in order to reduce a drive voltage of the modulation electrode. In this case, a polarization reversal region is provided in a portion (one section) surrounded by the dotted line such that signs of phase changes of a light wave before and after the turned-back potion are the same.

As shown in FIG. 4 and subsequent figures, the optical control element of the present invention is also applicable to a case where one optical waveguide is branched into a plurality of optical waveguides, and each branched optical waveguide is provided with a Mach-Zehnder type optical waveguide portion (MZ1, MZ2). A number of times of branching of optical waveguide is not limited to one, and the optical waveguide may be branched over a plurality of tiers. The number of branched waveguides branched at one time is not limited to two, and may be three or more. The Mach-Zehnder type optical waveguide portions provided in the branched optical waveguides can be easily implemented in a state of being in parallel by arranging branched waveguides of the respective Mach-Zehnder type optical waveguide portions and providing an even number of turned-back potions for the branched waveguides.

It is preferable that a shape of the optical waveguide at each turned-back potion is also the same shape. Specifically, the radii of curvature of a plurality of branched waveguides disposed in parallel are set to R, R+r, R+2r, ..., and R+nr (where R and r are constants, and n is a natural number) from the inside. In order to increase the radius of curvature R, a bending angle to be turned-back may be set to be more than 180 degrees (adjacent sections are parallel). (refer to the reference diagram) However, it goes without saying that it is necessary to set shapes of the different turned-back potions to be the same.

In FIG. 4, two modulation electrodes (M1, M2) are disposed for sub-Mach-Zehnder type optical waveguides (MZ1, MZ2), and two modulation signals (S11, S12) are input. As for a bias electrode, a bias electrode BM is disposed for the main Mach-Zehnder type optical waveguide, and bias electrodes BS1 and BS2 are disposed for the sub-Mach-Zehnder type optical waveguide. Since a sufficient space can be secured for each of the bias electrodes (BM, BS1, BS2), it is possible to reduce a bias voltage.

Instead of separately providing a bias electrode such as the bias electrode BM disposed in the main Mach-Zehnder type optical waveguide and the bias electrodes (BS1, BS2) disposed in the sub-Mach-Zehnder type optical waveguide in FIG. 4, a DC bias may be superimposed on a modulation signal applied to a modulation electrode so as to be applied.

Figure 5:
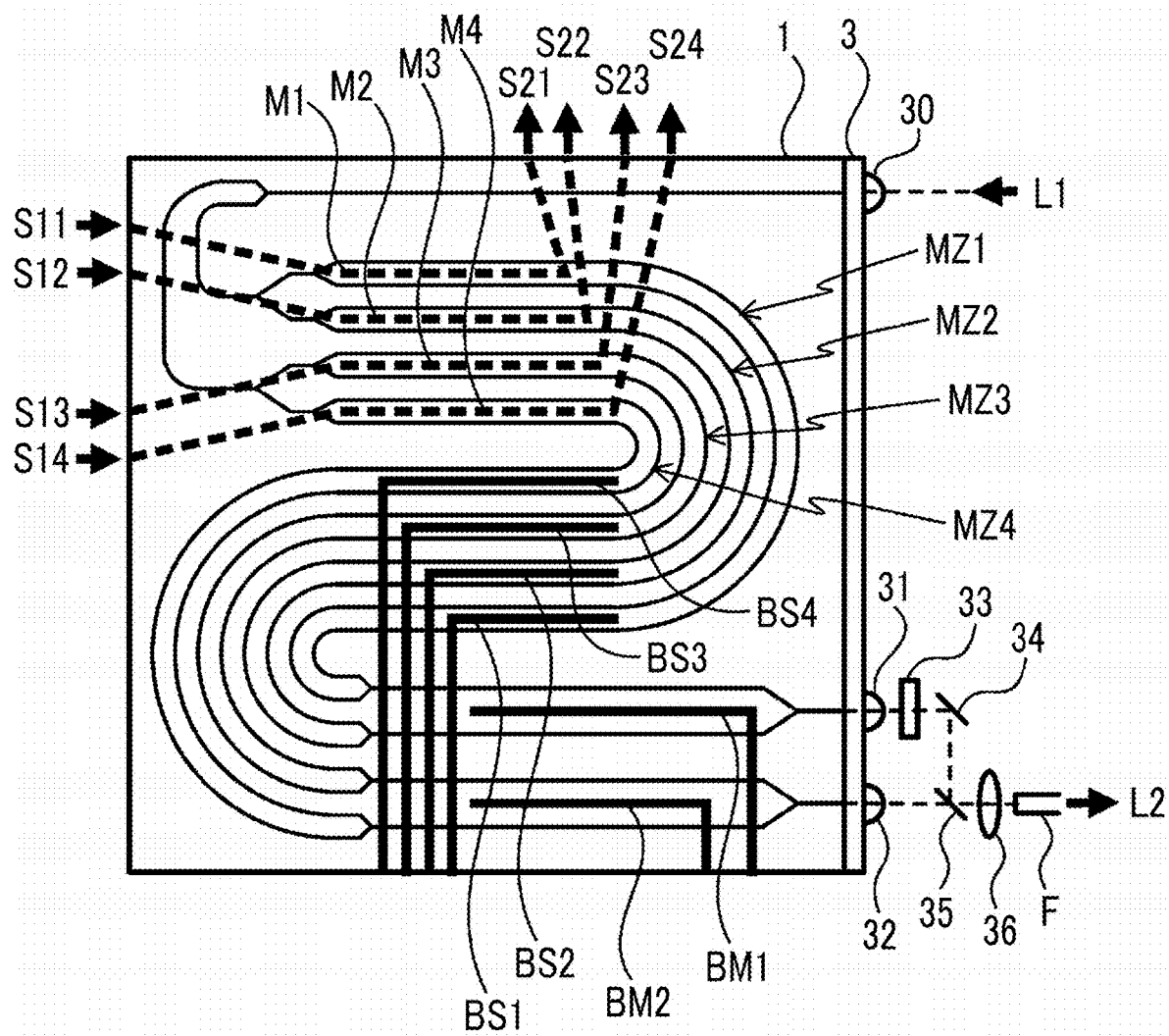
FIG. 5 is a plan view showing Example 5 of an optical control element according to the present invention.

FIG. 5 shows two nest type optical waveguides disposed in parallel. Four Mach-Zehnder type optical waveguides (MZ1 to MZ4) are disposed in parallel, and modulation electrodes (M1 to M4) and bias electrode (BS1 to BS4) are disposed for the respective Mach-Zehnder type optical waveguides. The bias electrodes (BM1, BM2) are also provided to correspond to the main Mach-Zehnder type optical waveguide of each nest type optical waveguide.

FIG. 5 shows an optical control element having a polarization combining function. Input light L1 is input to the optical waveguide in the substrate 1 through a lens 30 provided in an optical block 3. The input light is split into two on the way and modulated by each nest type optical waveguide to output two pieces of modulation signal light. Two light waves output from the substrate 1 are input to an optical fiber F through lenses (31, 32, 36). In this case, one of the light waves is rotated on a polarization plane by a half-wave plate 33, passes through reflection means 34 and polarization combining means 35, and is combined with another light wave to be polarization-combined into one output light. FIG. 5 schematically shows the case of combining light waves by spatial optics, but light waves may be polarization-combined by a waveguide type element.

In FIG. 5, optical path lengths of the respective optical waveguides from branching of the optical waveguide on the input side into two to input into the respective nest type optical waveguides are different. Therefore, it is necessary to precisely adjust a timing at which the modulation signals (S11, S12, S13, S14) are applied to the optical waveguides at the action portions (M1, M2, M3, M4) of the modulation electrodes. In order to achieve this, the modulation signal is output after a phase difference of the modulation signal is adjusted by using a digital signal processor (DSP; not shown), the signal is amplified by a driver circuit (not shown) and applied to the optical control element as a modulation signal.

Figure 6:
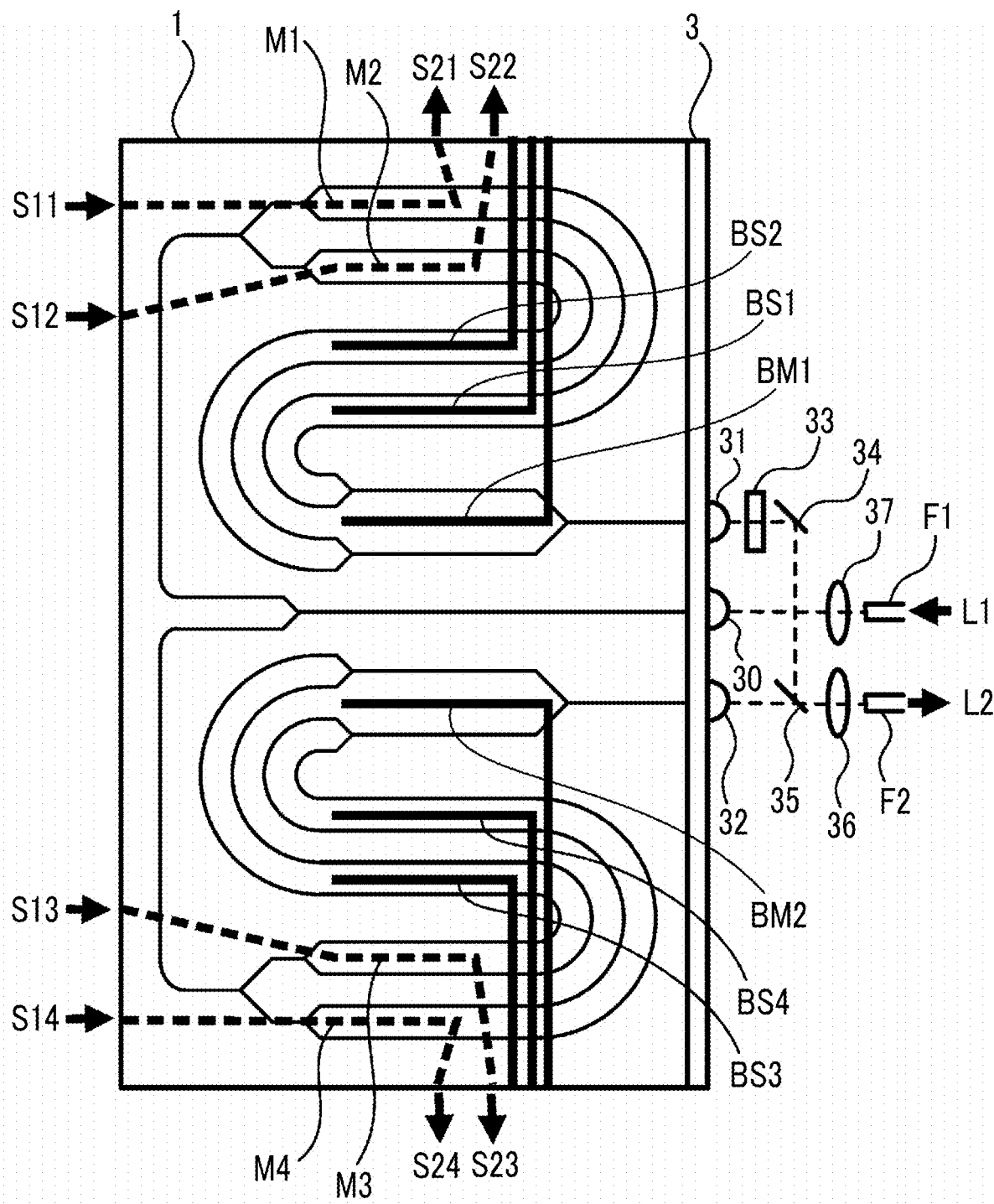
FIG. 6 is a plan view showing Example 6 of an optical control element according to the present invention.

FIG. 6 shows an optical control element having the same polarization combining function as in FIG. 5. In FIG. 6, two nest type optical waveguides, which are disposed after the optical waveguide is branched into two, are disposed on the left and right sides of an input waveguide input to which input light is input. This disposition has the drawback that a distance between the output lenses 30 and 32 in the figure is larger than the example in FIG. 5 and thus alignment at the time of implementation of polarization combining is difficult, but the action portions (M1 to M4) of the modulation electrode can be disposed apart from each other, so that crosstalk between modulation signals can be suppressed.

Figure 7:
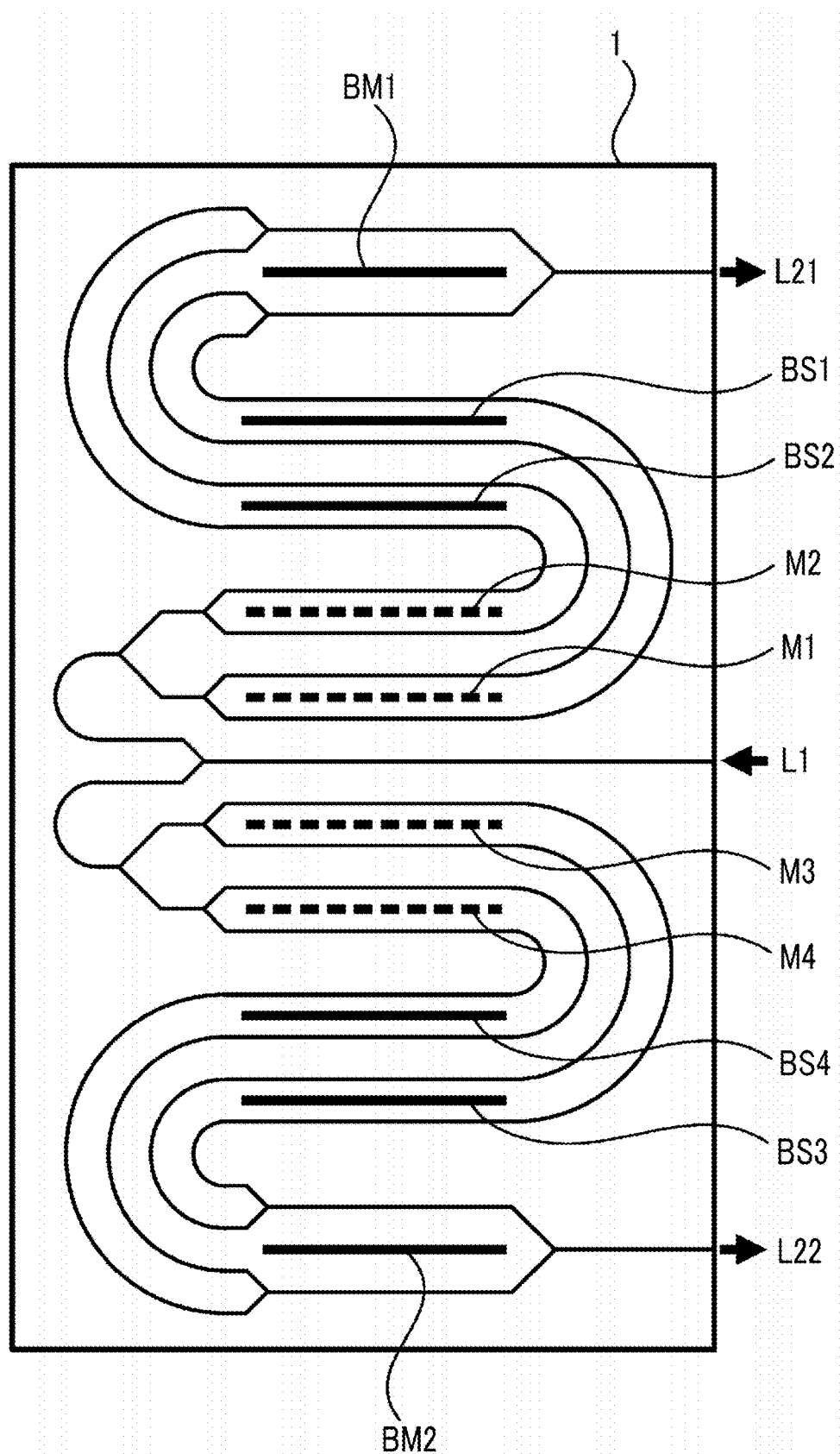
FIG. 7 is a plan view showing Example 7 of an optical control element according to the present invention.

FIG. 7 shows a modification example of the example in FIG. 6, in which a position of the input light L1 and positions of output light (L21, L22) are disposed to be separated. Accordingly, the modulation electrodes (M1 to M4) are disposed near the input waveguide.

In this configuration, the modulation electrodes are disposed closer to each other than in the configuration in FIG. 6, and thus a transmission loss of the modulation signal can be reduced until the modulation signal is input to the modulation electrodes.

FIG. 7 does not show a polarization combining function, but the function may be provided. From FIG. 7 and the subsequent figures, only positions of action portions of the modulation electrode and the bias electrode are shown, and a lead-in portion of each electrode is not shown.

Figure 8:
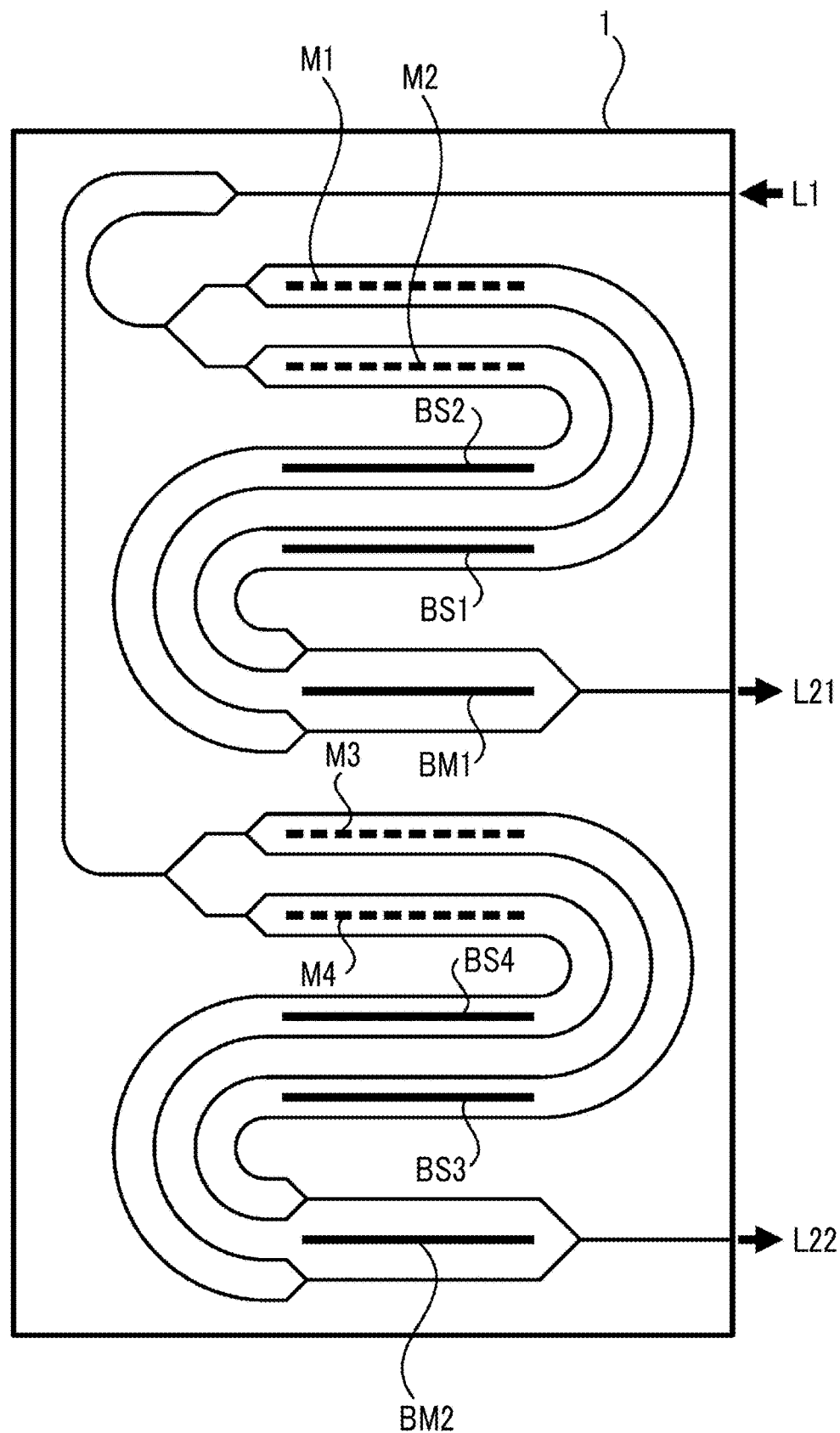
FIG. 8 is a plan view showing Example 8 of an optical control element according to the present invention.

FIG. 8 shows a modification example of the example in FIG. 7, in which an input position of the input light L1 is disposed on the upper part of the substrate 1, nest type optical waveguides are stacked, and one piece of output light L21 is disposed near the central part of the substrate 1, and another piece of output light L22 is disposed on the lower part of the substrate 1.

Figure 9:
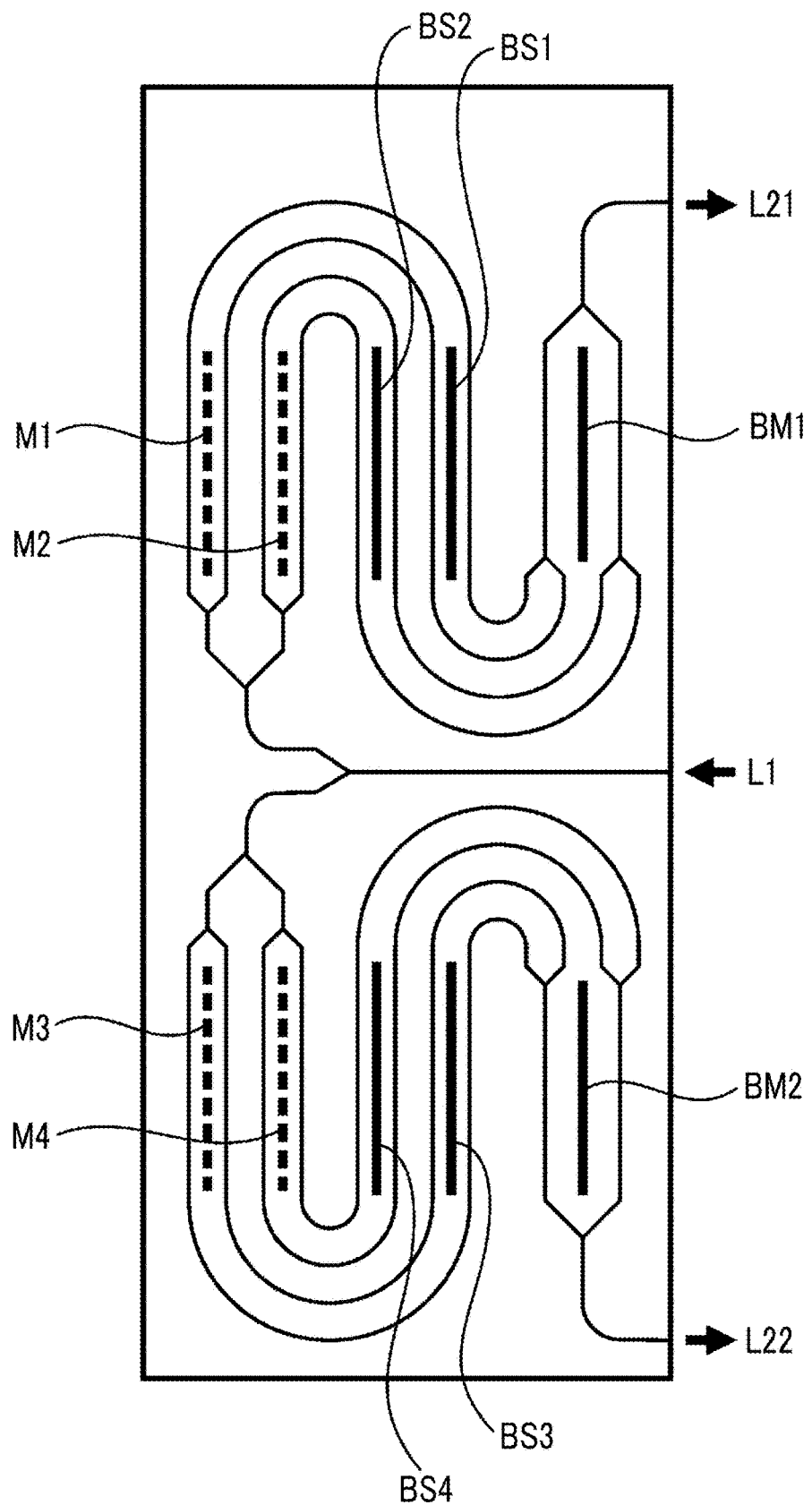
FIG. 9 is a plan view showing Example 9 of an optical control element according to the present invention.

FIG. 9 differs from the examples up to FIG. 8 in that the action portions of the modulation electrode and the bias electrode are disposed in a direction perpendicular to an input direction of a light wave (horizontal direction in the figure). As described above, the optical control element of the present invention has a high degree of freedom in designing an optical waveguide, and can employ various forms.

Figure 10:
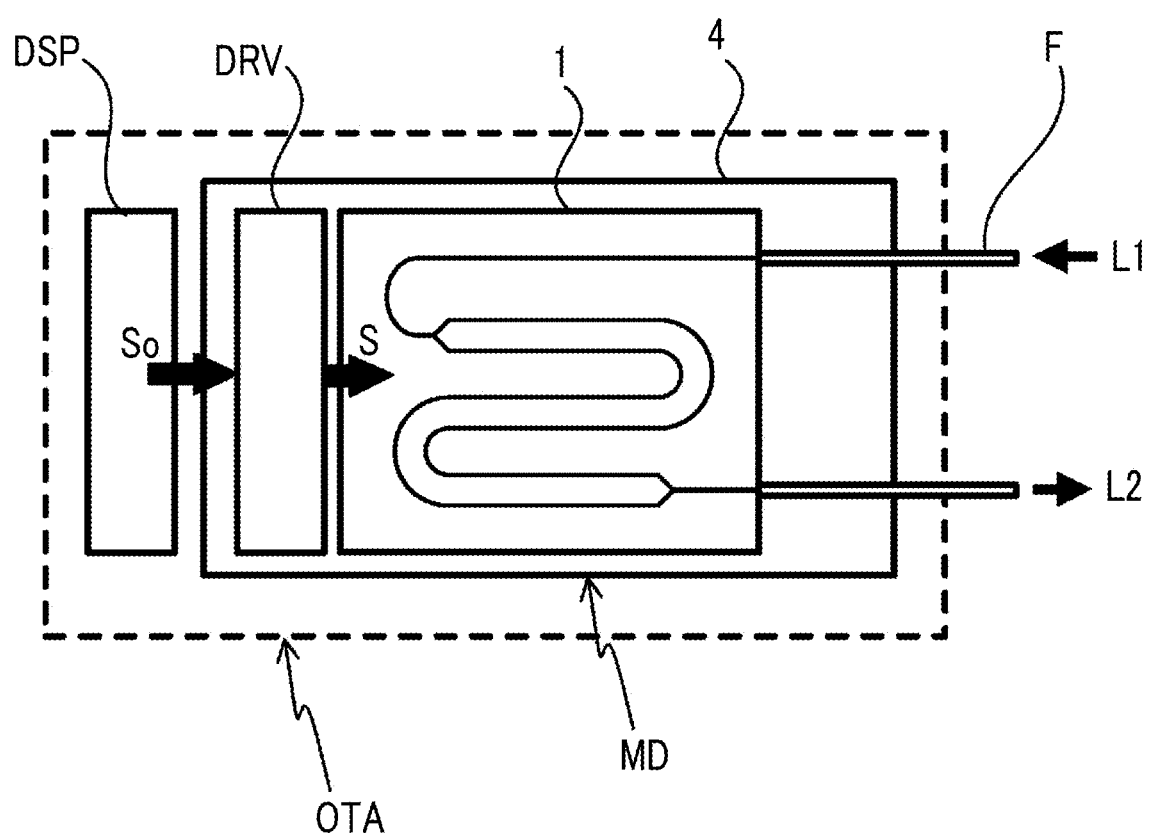
FIG. 10 is a plan view showing an optical modulation device and an optical transmission apparatus according to the present invention.

As shown in FIG. 10, by accommodating the optical control element 1 of the present invention in a case 4 made of metal or the like and connecting the optical control element 1 to the outside of the case via the optical fiber F, a compact optical modulation device MD can be provided. Of course, the optical fiber may be directly connected to the input portion or the output portion of the optical waveguide of the substrate 1, or may be optically connected to the input portion or the output portion via a space optical system.

An optical transmission apparatus OTA can be configured by connecting an electronic circuit (digital signal processor DSP) that output a modulation signal for causing the optical modulation device MD to perform a modulation operation, to the optical modulation device MD. A driver circuit DRV is used because the modulation signal applied to the optical control element is required to be amplified. The driver circuit DRV and the digital signal processor DSP may be disposed outside the case 4, or may be disposed inside the case 4. In particular, by disposing the driver circuit DRV inside the case, it is possible to further reduce a propagation loss of the modulation signal from the driver circuit.

INDUSTRIAL APPLICABILITY

As described above, according to the present invention, it is possible to provide an optical control element that can minimize an optical path difference between branched waveguides while reducing a difference in structure between the branched waveguides by disposing an input portion and an output portion of an optical waveguide on the same side of a substrate on which the optical waveguide is formed. It is possible to provide an optical modulation device and an optical transmission apparatus using this optical control element.

REFERENCE SIGNS LIST

1: Substrate
2: Optical waveguide
21, 22: Branched waveguide
A1, A2: turned-back potion
B1, B2: Bias electrode (action portion)
M: Modulation electrode (action portion)
MD: Optical modulation device
MZ: Mach-Zehnder type optical waveguide
OTA: Optical transmission apparatus

The invention claimed is:

1. An optical control element comprising:
a substrate having an electro-optic effect;
an optical waveguide formed on the substrate; and
a control electrode controlling a light wave propagating through the optical waveguide, wherein
an input portion and an output portion of the optical waveguide are formed on the same side of the substrate,
the optical waveguide includes at least one Mach-Zehnder type optical waveguide portion that has two branched waveguides branched from one optical waveguide and combines the two branched waveguides to form one optical waveguide,
the branched waveguides have an even number of turned-back portions,
the control electrode includes a modulation electrode and a bias electrode,
the branched waveguides has a plurality of sections separated by the turned-back portions of the branched waveguides,
the modulation electrode and the bias electrode are provided in different sections of the branched waveguides,
the bias electrode is disposed in each of the sections before and after the turned-back portions,
the bias electrode has at least two wirings, each of which branches into a plurality of electrode portions,
in each of the sections, the wirings are arranged intersecting the branched waveguides,
in each of the sections, the electrode portions of the two wirings are arranged along the branched waveguides and opposite each other,
the electrode portions of one wiring and the electrode portions of the other wiring extend in opposite directions from each wiring along the branched waveguides, and
in each of the sections, the sign of the phase change formed by the bias electrode is set to be the same.

2. The optical control element according to claim 1, wherein
optical path lengths of the branched waveguides are set to be same as each other.

3. The optical control element according to claim 1, wherein
one optical waveguide is branched into a plurality of optical waveguides, each branched optical waveguide is provided with the Mach-Zehnder type optical waveguide portion, and the branched waveguides of the Mach-Zehnder type optical waveguide portion have an even number of turned-back portions in a state in which the Mach-Zehnder type optical waveguide portions are disposed in parallel.

4. An optical modulation device comprising:
the optical control element according to claim 1;
a case that accommodates the optical control element; and
an optical fiber through which light waves are input to and output from the optical control element.

5. The optical modulation device according to claim 4, further comprising:
an electronic circuit that amplifies a modulation signal input to the optical control element and is provided inside the case.

6. An optical transmission apparatus comprising:
the optical modulation device according to claim 4; and
an electronic circuit that outputs a modulation signal for causing the optical modulation device to perform a modulation operation.

7. The optical control element according to claim 1, wherein
the modulation electrode is formed in a linear shape from an input portion to an action portion, and is led from the action portion to an output portion in a direction away from the bias electrode.

8. The optical control element according to claim 1, wherein
in one of sections before and after the turned-back portion, the electrode portions of one wiring are arranged so as to sandwich the electrode portion of the other wiring, and in the other one of sections, the other electrode portions of the other wiring is arranged so as to sandwich the other electrode portion of the one wiring.

* * * * *